Inventor:
Herman Bany,
by Harry E. Dunham
His Attorney.

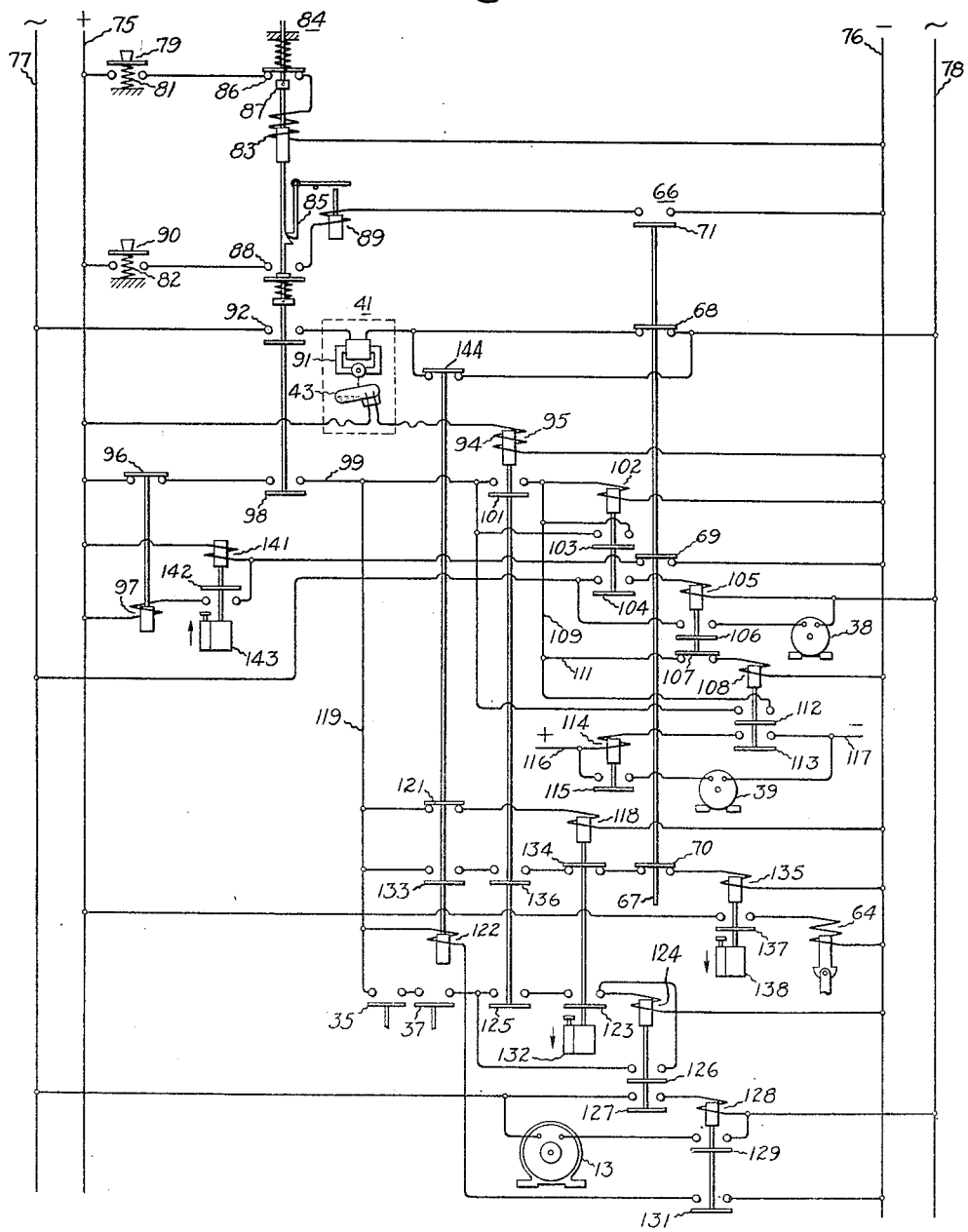

Patented June 10, 1941

2,245,175

UNITED STATES PATENT OFFICE 2,245,175

ELASTIC FLUID TURBINE TURNING GEAR CONTROL SYSTEM

Herman Bany, Lansdowne, Pa., assignor to General Electric Company, a corporation of New York Application October 19, 1939, Serial No. 300,197

10 Claims. (Cl. 60—1)

The present invention relates to control systems, particularly for apparatus for slowly rotating the rotor of an elastic fluid turbine during shutdown periods.

In steam turbine practice it has been found desirable to turn the rotor of the turbine, particularly after having been shut down, at a speed of the order of one or two R. P. M. The turbine rotor may thereby be cooled uniformly, and creeping or sagging of the shaft will be precluded as well as the formation of internal stresses. This slow speed turning is usually accomplished by means of an electric motor and speed reducing gearing connected to the turbine shaft. An auxiliary lubricating oil pump is also provided for supplying lubricating oil to the bearings of the turbine when it is being driven by the turning gear motor. When steam is admitted to the turbine preparatory to the bringing of the machine up to normal operating speed, the turning gear is disconnected from the turbine shaft and the auxiliary oil pump stopped.

It is an object of this invention to provide a new and improved electrical control system for an elastic fluid turbine turning gear apparatus.

Another object of my invention is to provide a new and improved electrical control system for an elastic fluid turbine turning gear apparatus including an auxiliary lubricating system which is adapted for manual control during shutdown periods of the turbine and for automatic control by the turbine when it is being started up or being shut down.

Figure 1:
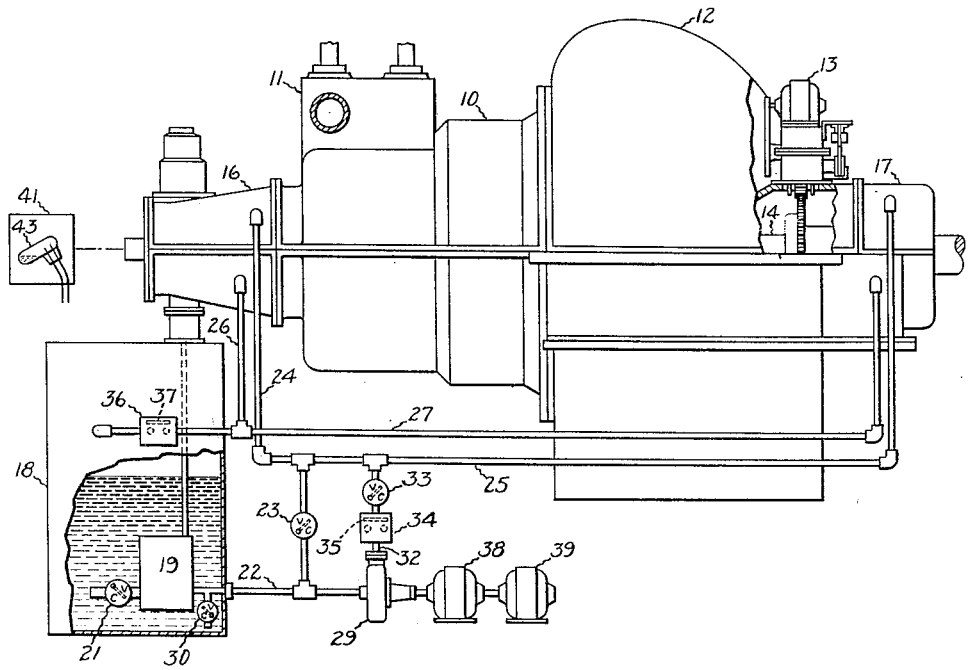
Figure 2:
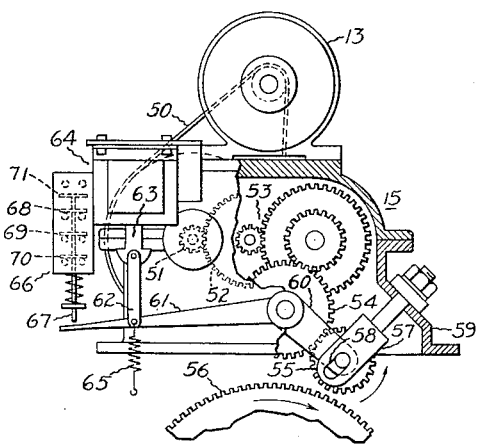

For a consideration of what I believe to be novel and my invention, attention is directed to the following description and the claims appended thereto taken in connection with the accompanying drawings. In the drawings, Fig. 1 illustrates a diagrammatic view of a turbine equipped with a turning gear mechanism and an auxiliary oil lubricating system; Fig. 2 is a sectional view of the turning gear mechanism illustrating certain features thereof; and Fig. 3 is a wiring diagram illustrating the control system for the turning gear and the auxiliary lubricating apparatus of the arrangement shown in Fig. 1.

The power plant arrangement as shown in Fig. 1 comprises an elastic fluid turbine 10 provided with an inlet steam chest 11 and an exhaust hood 12. During periods of shutdown the turbine rotor is adapted to be turned at a relatively slow speed by means of a turning gear mechanism which in the present instance comprises an electric motor 13 connected to the turbine shaft 14 through suitable speed reducing gearing indicated at 15. The lubricating system for the main turbine bearings 16 and 17 comprises a lubricant storage reservoir 18 in which is usually arranged the main oil pump 19. During the normal operation of the turbine the lubricating oil pump 19 will draw oil through the non-return inlet port 21 and discharge it through connection 22, the check valve 23, feeder lines 24 and 25, to the turbine bearings 16 and 17, respectively. Oil is drained from the turbine bearings by conduits 26 and 27 and returned to the reservoir 18.

An auxiliary oil pump 29 is provided for circulating the lubricating oil through the turbine bearings when the turbine is rotated by the turning gear motor. The pump 29 is adapted to withdraw oil from the storage reservoir 18 through the check valve 30 bypassing the main pump 19, the connection 22, and discharge it through the connection 32, the check valve 33, into the feeder lines 24 and 25. A suitable oil pressure responsive device 34 is provided in the pump outlet connection 32, having contact 35 which is adapted to be moved to the closed circuit position upon the occurrence of a predetermined suitable oil pressure. To indicate that oil is properly circulating through the bearings of the turbine, a flow responsive device 36 is arranged in the drain connection from the bearings to the reservoir, which device is provided with contact 37 that is adapted to be moved to the closed circuit position upon the occurrence of proper oil flow through the drain conduit. The auxiliary oil pump 29 is adapted to be driven by either of a pair of motors 38, 39 which may be connected to different sources of power and are controlled, as will be later described, so that in the event of power failure of one source, the other motor will be immediately connected in service to insure a continuity of lubricant circulation.

Suitably connected for actuation by the turbine shaft 14 is a speed responsive device 41 provided with a circuit making and breaking switch indicated at 43 which is normally closed and adapted to be moved to the open circuit position upon the turbine shaft being rotated at a speed greater than approximately one R. P. M. Although any suitable speed responsive device may be used, I prefer to use a device such as that described in the Patent No. 2,129,534, Newell, issued September 6, 1938, and assigned to the assignee of the present invention. A device of the type described in this patent is accurately responsive to extremely slow rotational speeds, as of the order of one R. P. M.

Referring to Fig. 2, the turning gear motor 13 is suitably connected to the speed reducing gearing as by a belt 50. The speed reducing gearing may comprise a suitably arranged train of gears, such as 51, 52, 53 and 54. Torque is transmitted from the gear 54 to the turbine rotor through the gear 55 which is adapted for shiftable movement into and out of engagement with the gear 56 secured to and forming a part of the turbine rotor. The gear 55 normally has the lowest speed of the speed reducing gearing and is accordingly subjected to a high specific tooth pressure. It is therefore important with respect to this gear that the torque be uniformly transmitted through the entire length of its teeth. For this reason the gear is yieldingly supported so that it may adjust itself during operation by means including the yoke 57 which is suitably slotted at 58 for receiving the ends of the gear shaft and is secured to the lower half 59 of the gear casing. The gear 55 may be moved into and out of engagement with the gear 56 by means including a lever 60 which is fulcrumed on the shaft of gear 54. Connected to the lever 60 is an extension 61 which is connected by link 62 to the armature 63 of the electromagnetic operating device 64. The gear 55 is normally biased to the non-engaging position by means of the spring 65 attached to the operating lever 61. Upon the energization of the electro-magnetic device 64, the end of the operating lever 61 is raised upwardly to rotate the gear 55 about the axis of gear 54 to bring the former into meshing engagement with the turbine rotor gear 56. A suitable switch 66 is operatively associated with the mechanism to indicate the position of the gear 55. The switch 66 is provided with a downwardly biased stem 67 which, for example, may be engaged by the operating lever 61 as it is moved upwardly to the gear engaging position. Arranged for actuation by the stem 67 are contacts 68, 69 and 70 which are adapted to be moved to the open circuit position as lever 61 is moved upwardly, and contact 71 which is adapted to be closed simultaneously with the opening of the other contacts.

The operation of the turbine turning and lubricating apparatus is adapted for control by a manual pushbutton start switch which, when depressed, automatically starts the lubricating oil pump and after suitable oil pressure is built up and suitable oil flow through the turbine bearings takes place, the turning motor 13 will be energized. After the turning motor has started, the gear 55 is shifted into engagement with the turbine rotor gear 56. The operation of the turbine turning apparatus and lubricating oil system will continue until a manual pushbutton stop switch is depressed or until steam is admitted to the turbine and the latter is thereby rotated at a speed greater than one R. P. M., when the turbine turning motor will automatically be disconnected from the turbine shaft and the auxiliary lubricating oil pump driving motor will be automatically deenergized. In the shutting down of the power plant, when the turbine speed has dropped to approximately one R. P. M., the auxiliary oil pump is again started up and the turning gear motor is again energized and automatically coupled to the turbine rotor.

Referring now to the schematic wiring diagram of Fig. 3, the control system will be more completely described. Power is adapted to be supplied to the apparatus of the control system from a suitable direct current source, such as 125 volts, indicated by the positive and negative supply leads 75 and 76, respectively. Certain pieces of apparatus of the system require, or are more appropriately energized from, a source of alternating current which may be supplied through leads 77 and 78. A manual starting control switch 79, normally biased to the open circuit position by means of a suitably arranged spring 81, is provided which, when closed, completes an energizing circuit for the winding 83 of the relay 84. As the relay 84 picks up, it is latched in by the catch 85 while the series contacts 86 thereof are moved to the open circuit position by stop 87 to deenergize the winding 83. Contacts 88 of the relay 84 close to condition the circuit of the latch tripping solenoid 89 for energization at a later time. The circuit for the latch tripping solenoid 89 includes the normally open contact of the manual pushbutton stop switch 90 and normally open contact 71 of the position indicating switch 66 associated with the turbine turning mechanism. The switch 90 is biased to the open position by means of a suitably arranged spring 82. It will here be noted that the contact 71 is closed only when the turning gear is engaged, which safeguards against tripping of the relay 84 at any other time and insures that the turbine will automatically go on turning gear upon shutdown from operation by steam. A circuit is also completed for the energizing element 91 of the speed responsive device 41, which circuit extends from the alternating current supply line 77 through the closed contacts 92 of relay 84, through the energizing element 91 of the speed responsive device 41, the normally closed contacts 68 of the position switch 66, to the other alternating current supply line 78. Since the turbine is at standstill, the switch 43 of the speed responsive device 41 will be actuated to the contact-making position so as to connect the winding 94 of the auxiliary relay 95 across the direct current supply lines 75 and 76. As the relay 84 picks up, circuits are established for energizing both auxiliary pump motors 38 and 39. The control circuit for these motors extends from the supply line 75 through the closed contact 96 of the deenergized relay 97, the closed contact 98 of the control relay 84, line 99, closed contact 101 of relay 95, the winding of relay 102, to the other supply line 76. As relay 102 picks up, its contact 103 completes a holding circuit around the contacts 101, and its contact 104 completes an energizing circuit for the alternating current contactor 105 which, in turn, picks up its contact 106 to connect the motor 38 across the alternating current supply lines 77 and 78. If for any reason the alternating current source of supply fails during either the starting or shutting down periods, the second motor 39 will be energized to maintain the operation of the oil pump 29. The contactor 105 is provided with a second contact 107 which in the deenergized condition of contactor 105, completes an energizing circuit for the relay 108. The circuit for the latter relay extends from the energized line 99 through closed contactor 105 is provided with a second contact 107 of the contactor 105, through the winding of the relay 108, to the other supply line 76. As the relay 108 picks up, its contact 112 completes a holding circuit around the contacts 101 of relay 95 while its contact 113 completes an energizing circuit for the auxiliary contactor 114 which picks up its contact 115, thereby connecting the auxiliary direct current motor 39 across a suitable direct current source of supply, such as 550 volts, represented by lines 116 and 117. Upon the reestablishment of the alternating current source of supply, the contactor 105 will pick up to effect the energization of the alternating current motor 38 and deenergization of motor 39.

Upon the closure of contact 98 of the control relay 84, another circuit is completed for effecting the energization of the time delay dropout relay 118. This latter circuit extends from the energized line 99, through line 119, the closed contact 121 of the deenergized relay 122, through the winding of the relay 118, to the other direct current supply line 76. The relay 118 picks up to close its contact 123 and upon proper operation of the lubricating oil system, as indicated by the closure of the contacts 35 of the oil pressure responsive device 34 and closure of contacts 37 of the oil flow responsive device 36, the control relay 124 will be energized to effect the energization of the turbine turning gear motor 13. The circuit for the control relay 124 may be traced from the energized line 119, through the closed contacts 35 and 37 of the oil pressure and oil flow responsive devices 34 and 36, respectively, the closed contact 125 of the auxiliary relay 95, the closed contact 123 of the relay 118, through the winding of the control relay 124, to the other supply line 76. As the relay 124 picks up, its contact 126 completes a holding circuit for itself around the contacts 125 and 123 of the relays 95 and 118, respectavely. A second contact 127 of the relay 124 completes an energizing circuit for the contactor 128 which picks up its contact 129 to connect the turbine turning gear motor 13 directly across the alternating current supply lines 77 and 78.

The closed contact 131 of the contactor 128 completes an energizing circuit for the relay 122. This relay when energized opens its contact 121 to deenergize the relay 118 but because of the time delay device 132 associated with the latter relay, its dropout will be delayed for a few seconds in order to give the motor 13 time to come up to normal speed. A second contact 133 of the relay 122 will be moved to the closed circuit position and after relay 118 drops out, the contact 134 of the latter will close to complete an energizing circuit for the time delay dropout relay 135, which circuit extends from the energized conductor 119 through the closed contact 133 of relay 122, the closed contact 136 of the relay 95, the closed contact 134 of the relay 118, the closed contact 70 of the position switch 66, through the winding of relay 135, to the other supply line 76. The relay 135 will pick up its contact 137, thereby completing an energizing circuit for the winding of the solenoid 64 which will effect the coupling of the turbine turning gear to the turbine rotor shaft by shifting the gear 55 into engagement with the turbine shaft gear 56. After this coupling has been effected, the position switch 66 will be shifted upwardly by the engagement of the lever 61 with the switch stem 67, thereby opening contact 70 and deenergizing the relay 135 which in turn will drop out with a suitable time delay, as determined by the setting of the mechanism 138, to deenergize the solenoid 64. It is to be understood that continuous energization of the solenoid operating device 64 is not required for maintaining the coupling between the turbine turning motor 13 and the turbine rotor. It will be noted from an inspection of the gearing arrangement of Fig. 2 that when the gear 55, being driven in the direction indicated, is brought into mesh with the turbine rotor gear 56, the gear 55 will be maintained in the engaging position by the forces acting during the transmission of torque from the motor to the turbine.

If it is desired to start up the turbine, steam is admitted thereto while the turning gear motor is slowly rotating the turbine rotor. When the turbine commences to accelerate and the gear 56 is rotated at a speed relatively greater than the normal speed of gear 55, the latter gear will be automatically shifted upwardly to the disengaged position where it will be held by spring 65.

At a turbine speed greater than one R. P. M. the contacts 43 of the speed responsive device 41 are open-circuited and relay 95 will drop out. The turbine turning gear motor 13 and the auxiliary oil pump motor will be deenergized upon the opening of contact 96 of relay 97. With regard to this latter relay, it will be noted that when the turning gear was first shifted to the engaged position and the position of switch 66 was moved upwardly, the contact 69 thereof was moved to the open circuit position deenergizing the relay 141 which thereupon closed its contact arm 142. When the turning gear is shifted to the disengaged position upon the acceleration of the turbine, the contact 69 is reclosed to again energize the relay 141. Due to the time delay restrain device 143 of the latter relay, the circuit will be closed for temporarily energizing relay 97 in parallel with relay 141. As the contact 96 of relay 97 opens, line 99 will be deenergized and hence also the pump motor control relay 102 and relay 108 if it had been energized. Relay 124 will also be deenergized which in turn will cause contactor 128 to drop out and shut down the turning gear motor 13. After a short time delay, relay 141 will pick up its arm 142 and deenergize the relay 97 which will close its arm 96 to recondition the system for a subsequent starting.

When it is decided to shut down the power plant and the supply of steam to the turbine is cut off, the turbine rotor will automatically be recoupled with the turning gear for rotation thereby during the cooling period of the turbine. As the turbine speed drops to a value of about 1 R. P. M. the switch 43 of the speed responsive device 41 will move to the closed circuit position effecting the energization of the control relay 95. As the relay 95 is moved to the closed circuit position, the appropriate oil pump motor and the turning gear motor will be started automatically and the turning gear connected to the turbine rotor in a manner as described above. The turbine will be rotated continuously under proper lubrication at a speed of about 1 R. P. M. until it is again started up by steam or until it is brought to a standstill after the turbine rotor has thoroughly cooled.

The turning gear apparatus may be deenergized and the turbine brought to a standstill by depressing the manually operable stop switch 90 thereby completing an energizing circuit for the trip coil 89 which will actuate the latch 85 to the releasing position to allow the relay 84 to drop out. As the contact arm 98 of the latter relay opens, the auxiliary oil pump driving rotor and the turning gear motor will both be deenergized.

When the turning gear apparatus is thus deenergized the turning gear will normally remain coupled with the turbine rotor and as a result the switch 66 will be maintained in its upper position during the standstill condition of the turbine. An auxiliary contact arm 144 is provided on the stem of the relay 122 which contact arm in the deenergized condition of the relay completes a circuit bridging the contact 68 of the position switch 66. Should it be desired to place the turbine on turning gear operation again, the starting control push button 79 will be depressed energizing the relay 84 and the circuit for the energizing element 91 of the speed responsive device 41 will be completed through contacts 92 of the relay 84 and contact 144 of the deenergized relay 122. The remaining circuits for the starting sequence will be energized in the proper order substantially as described above.

Having described the principle of operation of my invention, together with the apparatus which I now consider to represent the best embodiment thereof, I desire to have it understood that the arrangement shown is merely illustrative and that the invention may be carried out by other means.

What I claim as new and desire to secure by Letters Patent of the United States is:

1. In an electrical control system for a turbine turning gear apparatus including a motor and a turbine bearing lubricating system including an auxiliary oil pump motor, a control switch, means for initiating the operation of said pump motor upon the actuation of said switch, means responsive to predetermined conditions of the lubricating system for starting the operation of said turning gear motor, means for subsequently effecting the connection of said turning gear to said turbine, and means responsive to a predetermined speed of said turbine for effecting the deenergization of said pump motor and said turning gear motor.

2. In combination with a prime mover having a turning gear including a motor for slowly rotating a rotor of said prime mover during shutdown periods, an auxiliary lubricating system for said prime mover including an oil pump motor, a control switch for said motors effective only during shutdown condition of said prime mover, means controlled by said switch for effecting the sequential energization of said oil pump motor and said turning gear motor, means automatically operable by said prime mover during starting for deenergizing said motors, and means automatically operable by said prime mover upon shutting down for effecting sequential starting of said pump motor and said turning gear motor.

3. In combination with a turbine, turning gear apparatus including a motor for slowly rotating the turbine rotor during shutdown periods, a motor driven pump for supplying said turbine with lubricant during turning gear operation, means for effecting the sequential starting of said motor driven pump and the starting of said turning gear motor, means effective only during a predetermined low speed condition of said turbine for effecting the connection between said turning gear apparatus and said turbine rotor, and means responsive to a predetermined speed of said turbine rotor for effecting the mechanical disengagement of said turbine rotor and said turning gear apparatus.

4. In combination with a turbine, turning gear apparatus including a motor for slowly rotating the rotor of said turbine during shutdown periods, an auxiliary lubricating system for said turbine including a motor driven pump, means for automatically starting said motor driven pump in response to a predetermined rotor speed during the shutting down operation of said turbine, and means responsive to a predetermined condition of operation of said lubricating system for automatically starting said turning gear apparatus.

5. In combination with a turbine, turning gear apparatus including a motor for slowly rotating the turbine rotor during shutdown periods, means including a motor driven oil pump for lubricating said turbine during turning gear operation, means responsive to the oil pressure, means responsive to oil flow, and means responsive to said pressure and flow responsive means for controlling said turning gear apparatus.

6. In an electrical control system for turbine turning gear apparatus including a motor, a control switch means, a latched-in relay having an operating coil and a trip coil adapted for control by said switch means, means controlled by said relay for starting said motor, means for automatically effecting engagement of said turning gear with said turbine, said turning gear being adapted to be automatically disengaged upon said turbine being rotated at a speed greater than normal turning gear speed, and means responsive to the disengagement of said turning gear for precluding tripping of said relay by said control switch means.

7. In an electrical control system for a turbine turning gear apparatus including a motor, control switch means for effecting the starting and stopping of said motor, means for automatically connecting said turning gear to said turbine following the starting of said motor, said turning gear being adapted to be automatically moved to the disengaged position upon said turbine being rotated at a speed greater than normal turning gear speed, means responsive to the automatic disengagement of said turning gear for stopping said turning gear motor, means responsive to a predetermined relatively low turbine speed upon turbine shutdown for restarting said turning gear motor and automatically connecting said turning gear to said turbine.

8. In an electrical control system for a turbine turning gear apparatus having a motor, control switch means, means responsive to the actuation of said control switch for starting said motor, means responsive to the starting of said motor for effecting engagement of said turning gear with the turbine rotor to rotate said turbine rotor at a predetermined speed, said turning gear being adapted to automatically disengage said turbine rotor upon said rotor being rotated at a speed greater than said predetermined speed, and means responsive to the operative condition of said turning gear whereby said control switch means is rendered effective for stopping said motor only when said turning gear is in the engaged position.

9. In an electrical control system for turbine turning gear apparatus including a motor, control switch means, means normally controlled by said switch means for starting and stopping said motor, means for automatically effecting engagement of said turning gear with said turbine, said turning gear being adapted for automatic disengagement upon said turbine being rotated at a speed greater than the normal turning gear speed, and means responsive to the automatic disengagement of said turning gear for precluding control of said motor by said switch means.

10. In combination with a turbine, a turning gear apparatus including a motor adapted to be coupled to the turbine rotor for slowly rotating said rotor during turbine shutdown periods, means responsive to a predetermined speed of said turbine by steam for effecting the uncoupling of said turning gear apparatus from said turbine rotor, and means responsive to a predetermined low turbine speed during the shutting down operation of said turbine for automatically coupling said turbine rotor with said turning gear apparatus.

HERMAN BANY.